(12) United States Patent (10) Patent No.: US 8,363,930 B1
Francis, Jr. et al. (45) Date of Patent: Jan. 29, 2013

(54) USE OF MATERIALS AND APPEARANCES TO MERGE SCANNED IMAGES

(75) Inventors: Anthony Gerald Francis, Jr., San Jose, CA (US); James J. Kuffner, Jr., Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/615,469

(22) Filed: Sep. 13, 2012

Related U.S. Application Data

(60) Provisional application No. 61/674,578, filed on Jul. 23, 2012.

(51) Int. Cl.
*G06K 9/00* (2006.01)
(52) U.S. Cl. ..................... 382/154
(58) Field of Classification Search .......... 382/154; 348/42–60; 356/600–613
See application file for complete search history.

(56) References Cited

U.S. PATENT DOCUMENTS

| 6,532,299 B1 * | 3/2003 | Sachdeva et al. ............ 382/128 |
| 7,684,613 B2 * | 3/2010 | Harada et al. ............... 382/154 |
| 2010/0303341 A1 * | 12/2010 | Hausler ...................... 382/154 |
| 2012/0176478 A1 | 7/2012 | Wang et al. |
| 2012/0177283 A1 | 7/2012 | Wang et al. |

OTHER PUBLICATIONS

Forbes, Kevin et al., Using Silhouette Consistency Constraints to Build 3D Models, Proceedings of the Fourteenth Annual Symposium of the Pattern Recognition Association of South Africa (PRASA 2003), Nov. 2003.

* cited by examiner

*Primary Examiner* — Alex Liew
(74) *Attorney, Agent, or Firm* — McDonnell Boehnen Hulbert & Berghoff LLP

(57) ABSTRACT

Methods and systems for merging scanned images of objects using materials and appearance information are described. An example method may include receiving material information and 3D geometry information for surfaces of an object based on a first and second viewpoint. The first viewpoint may differ from the second viewpoint by an amount of motion within a common reference system and the material information may identify given points of the surfaces of the object as being of a given material. The method may also include determining an alignment within the common reference system between first and second 3D geometry information. A processor may determine an error metric between both the 3D geometry information and the material information at multiple positions of the alignment, and adjust the alignment based on error metrics at the multiple positions so as to converge to a minimum error metric.

20 Claims, 8 Drawing Sheets

Computer Program Product 800

Signal Bearing Medium 801

Program Instructions 802

- receiving first material information and first three-dimensional (3D) geometry information associated with surfaces of an object based on a first viewpoint, wherein material information identifies given points of the surfaces of the object as being of a given material;

- receiving second material information and second 3D geometry information associated with the surfaces of the object based on a second viewpoint, wherein the second viewpoint differs from the first viewpoint by an amount of motion within a common reference system

- determining an alignment within the common reference system between the first 3D geometry information and the second 3D geometry information;

- determining via a processor an error metric between both the first 3D geometry information and the second 3D geometry information as well as between the first material information and the second material information at multiple positions of the alignment; and

- adjusting the alignment based on error metrics at the multiple positions so as to converge to a minimum error metric.

| Computer Readable Medium 803 | Computer Recordable Medium 804 | Communications Medium 805 |

FIGURE 8

USE OF MATERIALS AND APPEARANCES TO MERGE SCANNED IMAGES

CROSS-REFERENCE TO RELATED APPLICATIONS

This application claims the benefit of U.S. Provisional Application No. 61/674,578 filed on Jul. 23, 2012, the entirety of which is herein incorporated by reference.

FIELD

This disclosure relates to merging scanned images, and in examples, to merging scanned images of three-dimensional (3D) objects based on materials and appearances.

BACKGROUND

In computer graphics, three-dimensional (3D) modeling involves generation of a representation of a 3D surface of an object. The representation may be referred to as a 3D object data model, and can be rendered or displayed as a two-dimensional image via 3D rendering or displayed as a three-dimensional image. 3D object data models represent a 3D object using a collection of points in 3D space, connected by various geometric entities such as triangles, lines, curved surfaces, etc. Various techniques exist for generating 3D object data models utilizing point clouds and geometric shapes, for example.

Being a collection of data, 3D models can be created by hand, algorithmically, or based on data from objects that are scanned, for example. As an example, an artist may manually generate a 3D image of an object that can be used as the 3D model. As another example, a given object may be scanned from a number of different angles, and the scanned images can be combined to generate the 3D image of the object. As still another example, an image of an object may be used to generate a point cloud that can be algorithmically processed to generate the 3D image.

In some examples, a 3D scanner may collect data associated with a shape and appearance of an object. For example, the 3D scanner may create a point cloud of geometric samples on a surface of the object. The point cloud may represent distances to the surface at points visible in a field of view of the 3D scanner, and 3D position information for the points may be determined. Additionally, the 3D scanner may determine color information for the points of the surface.

SUMMARY

In one example aspect, a method is provided that comprises receiving first material information and first three-dimensional (3D) geometry information associated with surfaces of an object based on a first viewpoint. The material information may identify given points of the surfaces of the object as being of a given material. The method may also include, but is not limited to, receiving second material information and second 3D geometry information associated with the surfaces of the object based on a second viewpoint. The second viewpoint may differ from the first viewpoint by an amount of motion within a common reference system. The method further includes determining an alignment within the common reference system between the first 3D geometry information and the second 3D geometry information. Additionally, the method may include determining via a processor an error metric between both the first 3D geometry information and the second 3D geometry information as well as between the first material information and the second material information at multiple positions of the alignment. According to the method, the alignment may be adjusted based on error metrics at the multiple positions so as to converge to a minimum error metric.

In another example aspect, a non-transitory computer-readable memory having stored thereon instructions executable by a computing device to cause the computing device to perform functions is provided. The functions may comprise receiving first material information and first three-dimensional (3D) geometry information associated with surfaces of an object based on a first viewpoint. The material information may identify given points of the surfaces of the object as being of a given material. The functions may also include, but are not limited to, receiving second material information and second 3D geometry information associated with the surfaces of the object based on a second viewpoint. The second viewpoint may differ from the first viewpoint by an amount of motion within a common reference system. The functions may further include determining an alignment within the common reference system between the first 3D geometry information and the second 3D geometry information. Additionally, the functions may include determining via a processor an error metric between both the first 3D geometry information and the second 3D geometry information as well as between the first material information and the second material information at multiple positions of the alignment. According to the functions, the alignment may be adjusted based on error metrics at the multiple positions so as to converge to a minimum error metric.

In another example aspect, a system is provided that comprises a scanning component, a materials library, an alignment component, and an optimization component. The scanning component may be configured to determine color information and three-dimensional (3D) geometry information associated with surfaces of an object based on multiple viewpoints. Viewpoints of the multiple viewpoints may differ by amounts of motion within a common reference system. The materials library may include material information based on the color information. For example, material information may identify given points of the surfaces of the object as being of a given material. The alignment component may be configured to determine an alignment within the common reference system between first 3D geometry information of a first viewpoint and second 3D geometry information of a second viewpoint. Additionally, the optimization component may be configured to determine via a processor an error metric between both the first 3D geometry information and the second 3D geometry information as well as between first material information of the first viewpoint and second material information of the second viewpoint at multiple positions of the alignment. The optimization component may also be configured to adjust the alignment based on error metrics at the multiple positions so as to converge to a minimum error metric.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 8 is a schematic illustrating a conceptual partial view of an example computer program product that includes a computer program for executing a computer process on a computing device, arranged according to at least some embodiments presented herein.

DETAILED DESCRIPTION

Figure 1:
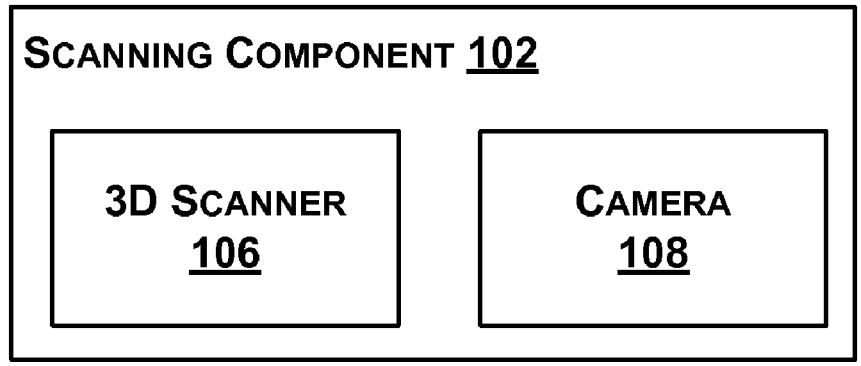
FIG. 1 illustrates an example system for merging scanned images.
Figure 1:
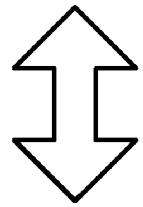
Figure 1:
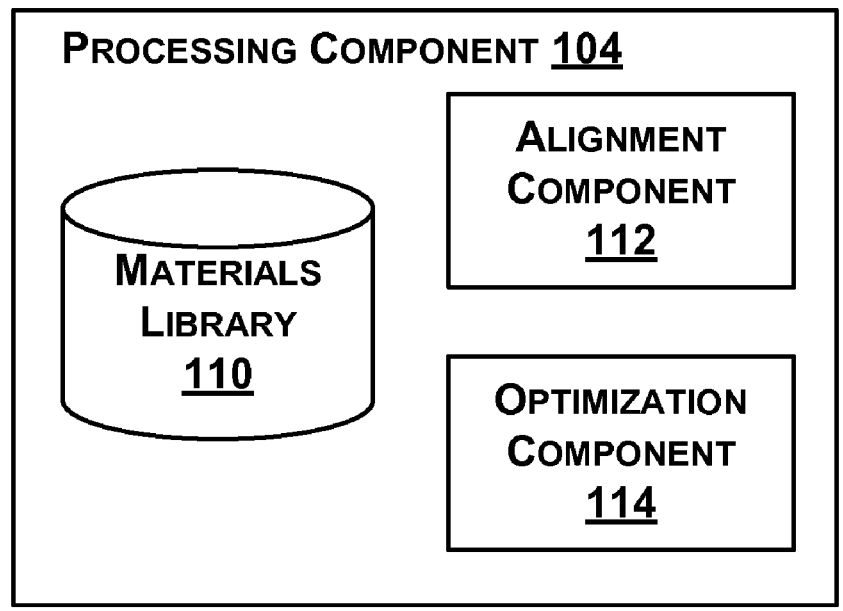

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

This disclosure may disclose, inter alia, methods and systems for merging scanned images of an object. In some examples, the scanned images may include three-dimensional (3D) geometry information as well as material and appearance information. For instance, an image may include depth information, such as a distance from a viewpoint an image was taken to a surface of the object. In addition, the image may include color or other types of appearance information describing the color of an object at different points on the surface. In some instances, a materials library may be utilized to determine a material of a portion of a surface of the object based on color and/or appearance information for the portion.

In one example, material information and 3D geometry information associated with surfaces of an object that are viewed from two or more viewpoints may be merged to determine a portion of a 3D model of the object. An example method may include receiving first material information and first 3D geometry information based on a first viewpoint and also receiving second material information and second 3D geometry information based on a second viewpoint. The first viewpoint may differ from the second viewpoint by an amount of motion within a common reference system, and an alignment within the common reference system between the first 3D geometry information and the second 3D geometry information may be determined. For instance, the alignment may involve determining an alignment between the first 3D geometry information and the second 3D geometry information based on an overlap between the first viewpoint and the second viewpoint. As an example, the first viewpoint and the second viewpoint may both capture 3D geometry information about a given portion of a surface of the object, and the alignment may register the first 3D geometry information and the second 3D geometry information together based on the overlap.

The example method may also include determining an error metric between both the first 3D geometry information and the second 3D geometry information as well as between the first material information and the second material information. In some instances, the error metric may include a comparison of 3D geometry information and material information from the first viewpoint and the second viewpoint at multiple positions of alignment. As an example, a determination may be made whether first material information and second material information agree (or are the same) for a given point of the alignment. For instance, the first material information may indicate a surface of the object is leather, while the second material information may indicate that the surface of the object is wood at the given point, and an error metric for the given point may reflect the discrepancy.

In some instances, based on error metrics at various points of the alignment, the alignment may be adjusted such that the error metrics at the various points converge to a minimum error metric. For example, an optimization technique may be used to minimize the error metrics for points of an alignment between the first viewpoint and the second viewpoint.

In other examples, the image may also include silhouette information, such as an outline of the object as seen from a viewpoint. Based on silhouette information for the first viewpoint and the second viewpoint, a resulting silhouette may be determined for a given alignment between the first viewpoint and the second viewpoint. In one instance, the silhouette may be compared with a representative silhouette for a class or type of object, and results of the comparison may be used to determine an adjustment to the alignment. Thus, material information and/or silhouette information may be used in addition to 3D geometry information to align images originating from overlapping viewpoints of an object.

Referring now to the figures, FIG. 1 illustrates an example system 100 for merging scanned images. The system 100 may include a scanning component 102 and a processing component 104. In some examples, the scanning component 102 may be a device that analyzes an object to collect data on its three-dimensional shape and/or appearance. As an example, the scanning component 102 may include a 3D scanner 106 configured to generate a point cloud based on a surface of an object visible in a field of view of 3D scanner. The point cloud may be a set of vertices in a three-dimensional coordinate system, for example, and may represent coordinates of an external surface of an object. Additionally, the scanning component 102 may include a camera 108 configured to collect color information for the surface of the object. For example, color information may be determined for points of a point cloud.

In one example, the 3D scanner 106 may be a non-contact 3D scanner. For instance, the 3D scanner 106 may be an active scanner that emits some kind or radiation and detects a reflection of the emitted radiation to probe an object. As an example, the 3D scanner may emit any type of light or an ultrasonic pulse. Various types of active scanners include time-of-flight 3D laser scanners and triangulation 3D laser scanners. In addition, the 3D scanner may be a structured-light 3D scanner or modulated light 3D scanner. In other examples, the 3D scanner may be a non-contact passive 3D scanner that detects reflected ambient radiation. For example, the 3D scanner may be a stereoscopic system employing two video cameras or a photometric system configured to capture multiple images under varying lighting conditions. In another example, the 3D scanner may capture a silhouette. For instance, a sequence of photographs of an object may be captured against a contrasting background, and the sequence of objects may be extruded and intersected to a form a visual hull approximation of the object.

The camera 108 may be any type of camera configured to capture images or videos of an object. In some instances, the 3D scanner 106 and the camera 108 may be directly coupled. For example, the 3D scanner 106 and the camera 108 may be part of a handheld scanning component. In other instances, the 3D scanner 106 and camera 108 may be separate. Optionally, the 3D scanner 106 and the camera 108 may communicate via a wired or wireless connection.

In some instances the scanning component 102 may include multiple 3D scanners and/or cameras. Similarly, the system 100 may include multiple scanning components. In some examples, the 3D scanner 106 may include a camera 108, and the camera 108 may be omitted. In other instances, the scanning component 102 may include a 3D camera, depth sensor, or other type of device configured to determine three-dimensional information.

In one example, the scanning component 102 may be connected via one or more wired and/or wireless connections to the processing component 104. In another example, the scanning component 102 and the processing component 104 may be part of a device, such as a portable or stationary scanning device. In some instances, the processing component 104 may include one or more processors and any number of data structures or memories. In one instance, the processing component 104 may be one or more computing devices. In other instances, the processing component 104 may be an application in a server with which the scanning component 102 is configured to operate via cloud computing.

The processing component 104 may include a materials library 110, alignment component 112, and optimization component 114. In one instance, the materials library 110 may determine a material for one or more points or groups of points on a surface of an object based on color information. For instance, the materials library 110 may be viewed as a function which determines a type of material based on color information. In one example, the materials library 110 may accept as input one or more color values, such as red, green, and blue (RGB) values or other types of color values, and determine a type of material based on the color values. In some examples, the material type may be associated with a number. For example, possible materials and associated numbers include leather (1), wood (2), metal (3), plastic (4), etc. Thus, the materials library 110 may identify given points of a surface as being of a given material based on color information.

In another example, the materials library 110 may accept as input a texture of one or more regions of a surface. For instance, the texture may be color and/or lighting information received from a 3D scanner or other types of extracted or determined texture mapping information. Based on the texture, the materials library 110 may perform pattern and/or image matching algorithms (e.g., template matching or feature-based matching) to match the texture to known texture samples or decals that are associated with different types of materials. In a further example, a surface of an object may be segmented into multiple regions based on colors or textures within regions of the surface, and pattern and/or image matching algorithms may be used to determine types of materials for the segmented regions.

In some examples, the alignment component 112 may be configured to determine an alignment or registration between two or more collections of 3D geometry information. For instance, the alignment component 112 may determine an alignment between first 3D geometry information based on a first viewpoint of an object and second 3D geometry information based on a second viewpoint that differs from the first viewpoint. In some instances, information captured from the first viewpoint and the second viewpoint may overlap in terms of surfaces of the object represented by the first 3D geometry information and the second 3D geometry information.

In one instance, the alignment component 112 may be configured to determine an alignment between the overlapping surfaces by bringing the first 3D geometry information and the second 3D geometry information into a common reference system. For example, the alignment component 112 may determine a transformation that positions the first 3D geometry information with respect to the second 3D geometry information within the common reference system. The transformation may be composed of a rotation matrix and a translation vector that when applied to the second 3D geometry information aligns the second 3D geometry information with the first 3D geometry information. In an instance in which the first 3D geometry information and the second 3D geometry information are point clouds, the alignment component 112 may identify corresponding points between the first 3D geometry information and the second 3D geometry information and determine a distance or alignment error between the corresponding points after the transformation. For example, the distance may be a Euclidean distance between two sets of three-dimensional coordinates.

Additionally, the alignment component may determine a material distance or error between material information associated with the first viewpoint and the second viewpoint. For example, the material distance may describe a difference between material information of a corresponding point according to first material information from a first viewpoint and second material information from a second viewpoint. In the instance in which the material information is associated with a number, the material distance may be a function of a number from the first material information and number from the second material information (e.g., a squared distance, absolute value, etc.). In an instance in which material information is segmented into regions, an additional component of the material distance may be determined by matching the boundary regions of the segmented regions in one viewpoint with the corresponding boundary regions of a second viewpoint. For example, a component of the material distance may be a distance between one or points of a boundary region of first 3D geometry information of the first viewpoint and corresponding points of the boundary region of second 3D geometry information of the second viewpoint.

The alignment error and material distance for corresponding points of an alignment between the first viewpoint and the second viewpoint may be combined to describe an overall error metric for the alignment. In one example, the error metric may be a sum of alignment errors and material distances for the corresponding points of an alignment. In one example, the optimization component 114 may communicate with the alignment component 112 to iteratively adjust the alignment until the error metric converges to a minimum or falls below a given threshold. The iterative closest point (ICP) algorithm and random sample consensus (RANSAC) algorithms are two example algorithms that may be used to minimize the error metric between corresponding points. If the optimization component 114 determines that the error metric has converged or fallen below the given threshold, the iterative process may end.

In other examples, the processing component 104 may include a silhouette database (not shown). The silhouette database may comprise representative silhouettes for given types of objects based on geometry information associated with a plurality of 3D models for objects of a given type. For instance, the silhouette database may include representative silhouettes for sneakers, boots, laptops, computers, furniture, cars, trucks, or any groups of products or objects.

In some examples, an alignment between the first 3D geometry information and the second 3D geometry information may be adjusted based on the representative silhouette for a given object. For example, a silhouette may be determined based on an alignment between the first 3D geometry information and the second 3D geometry information, and the silhouette may be compared with the representative silhouette. If the resulting silhouette differs from the representative silhouette by more than a predetermined amount, the alignment may be adjusted. In some instances, the optimization component 114 may iteratively adjust the alignment so as to reduce the difference between the resulting silhouette and the representative silhouette.

In some examples, an alignment between the first 3D geometry information and the second 3D geometry information may determine a portion of a 3D model. Thus, in some examples, the scanning component 102 and the processing component 104 may be used to merge scanned images of an object to determine a portion of a 3D model based on material and appearance information.

Figure 2:
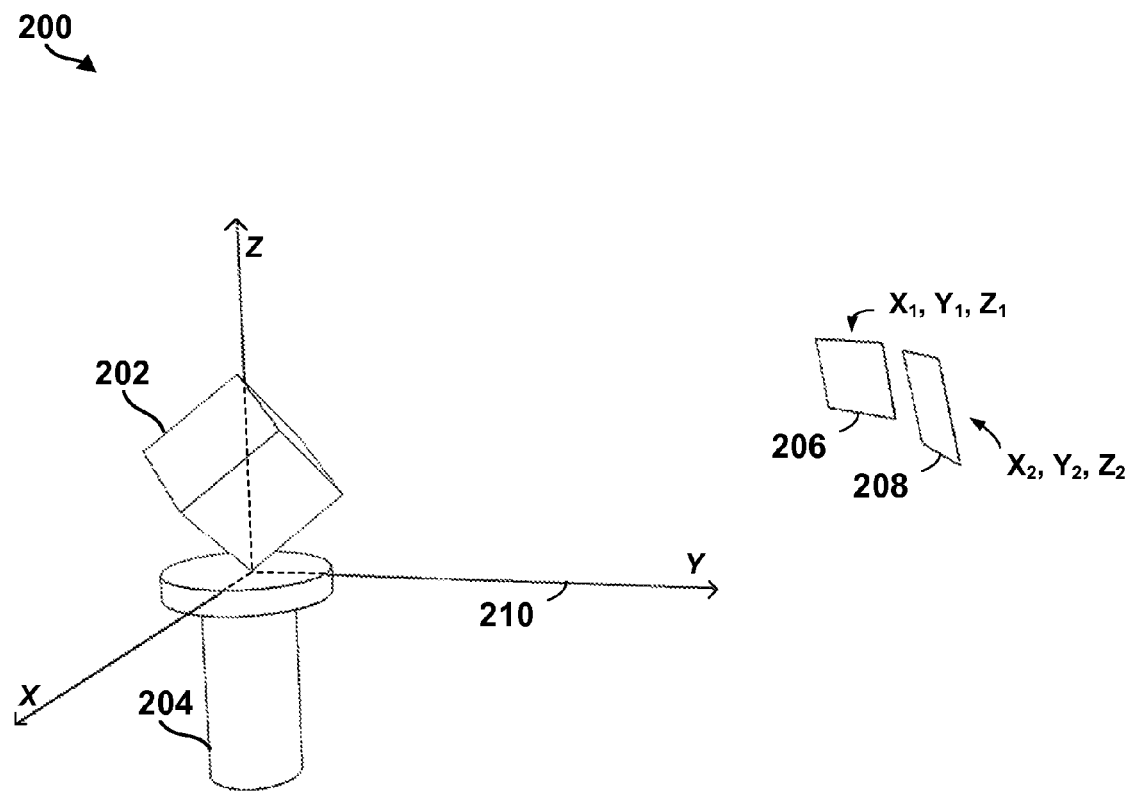
FIG. 2 illustrates an example conceptual illustration of viewpoints of an object.

FIG. 2 illustrates an example conceptual illustration 200 of viewpoints of an object 202. The object 202 may be any type of object. In some examples, the object 202 may be positioned on a stationary or rotating pedestal 204. In one instance, a three-dimensional (3D) scanner, such as a portable or stationary 3D laser scanner, may be used to determine material information and/or 3D geometry information for surfaces of the object 202. For example, material information and 3D geometry information for the object 202 may be obtained as the object 202 rotates on the pedestal 204. In one instance, the material information and 3D geometry information may be obtained from a first viewpoint 206 and a second viewpoint 208 as the object 202 rotates on the pedestal 204. For example, a first 3D scanner may obtain material and/or geometry information from the first viewpoint 206 while a second 3D scanner may obtain material and/or geometry information from the second viewpoint 208. In another example, the first 3D scanner may obtain material information and/or geometry information from the first viewpoint 206 during a first rotation of the object 202 and obtain material information and/or geometry information from the second viewpoint 208 during a second rotation of the object 202.

In another instance, the object 202 and the pedestal 204 may remain stationary while a viewpoint of a 3D scanner is varied. For example, a position of the 3D scanner may be varied such that material information and/or 3D geometry information are obtained from multiple viewpoints. In some examples, a position of the 3D scanner may be tracked with respect to a reference system 210 while the viewpoints are varied. For instance, the position of the 3D scanner may be tracked using reference features on surfaces of the object 202 such as adhesive reflective tabs or may be tracked using an external tracking method. External tracking methods may include detecting infrared light emitted by the 3D scanner using a camera and filtering techniques that provide resilience to ambient lighting. In some examples, a three-dimensional position of the 3D scanner (e.g., x-y-z coordinates) with respect to the reference system 210 may be stored with material information and/or 3D geometry information obtained from a given viewpoint.

Figure 3:
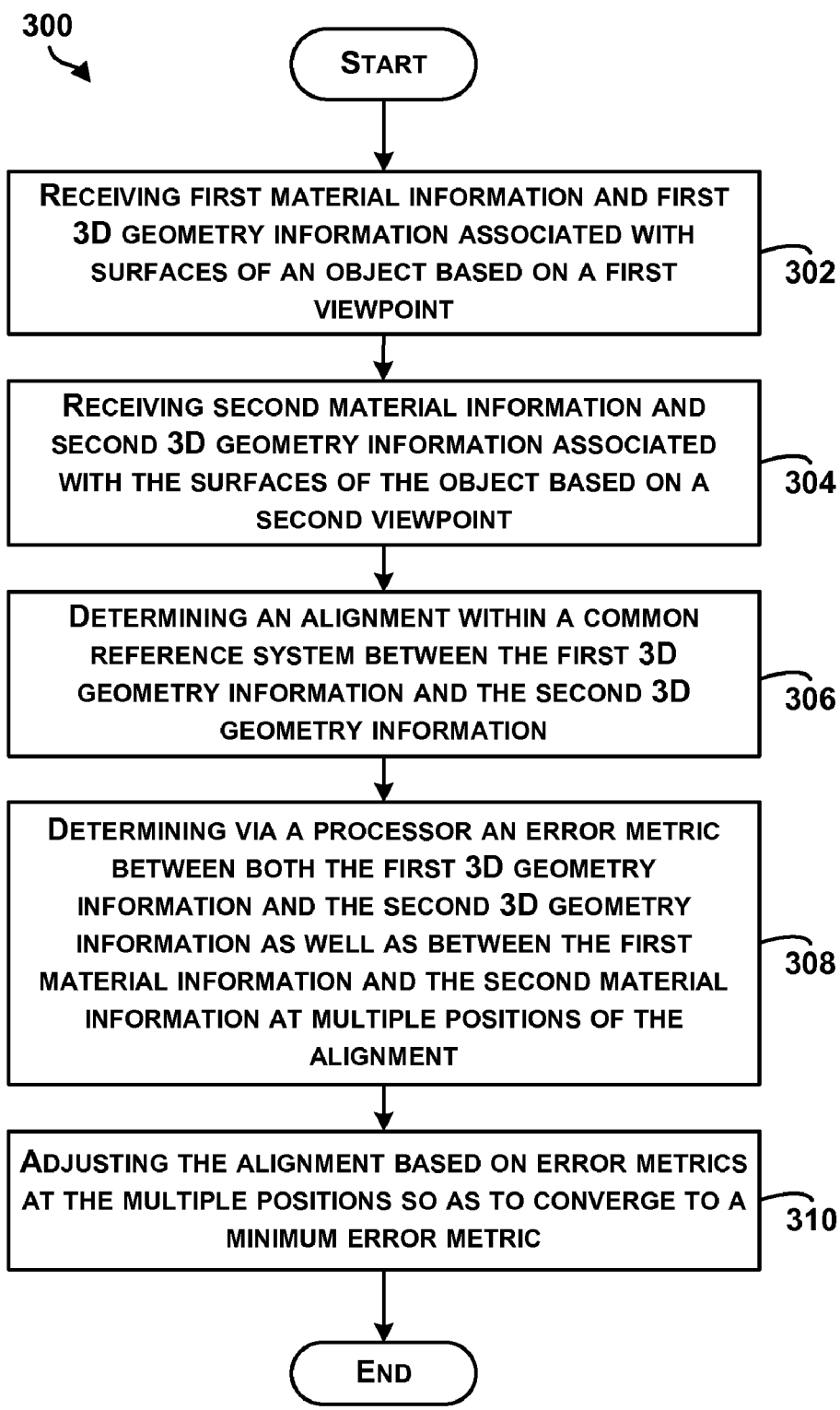
FIG. 3 is a block diagram of an example method for merging scanned images.

Additionally, an orientation of the object 202 on the pedestal 204 may be rotated such that surfaces of the object 204 previously obstructed by the pedestal 204 may be exposed during subsequent scans. Thus, in some instances, overlapping images of material information and 3D geometry information for surfaces of an object may be obtained from a 3D scanner. In some examples, images of material information and 3D geometry information may be merged to determine a portion of a 3D model of the object. FIG. 3 is a block diagram of an example method 300 for merging scanned images. Method 300 shown in FIG. 3 presents an embodiment of a method that could be used or implemented by the system 100 of FIG. 1, for example, or by components of the system 100 in FIG. 1, or more generally by a server or other computing device. Method 300 may include one or more operations, functions, or actions as illustrated by one or more of blocks 302-310. Although the blocks are illustrated in a sequential order, these blocks may also be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the block diagram shows functionality and operation of one possible implementation of present embodiments. In this regard, each block may represent a module, a segment, or a portion of program code, which includes one or more instructions executable by a processor or computing device for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and random access memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 300 and other processes and methods disclosed herein, each block in FIG. 3 may represent circuitry that is wired to perform the specific logical functions in the process.

Initially, at block 302, the method 300 includes receiving first material information and first three-dimensional (3D) geometry information associated with surfaces of an object based on a first viewpoint. In some examples, material information may identify given points of the surfaces of the object as being of a given material. In one example, color information associated with surfaces of the object may be received from a 3D scanner or camera and a materials library may be used to determine material information for points of the surfaces of the object based on the color information. In one example, the 3D geometry information may be a 3D point cloud determined based on distances from the first viewpoint to points on surfaces of the object. In some instances, points of the 3D point cloud may be associated with material information identifying a type of material of the surface of the object at a given point.

At block 304, the method 300 includes receiving second material information and second 3D geometry information associated with the surfaces of the object based on a second viewpoint. In one example, the second viewpoint may differ from the first viewpoint by an amount of motion within a common reference system. A portion of the second material information and second 3D geometry information may overlap with a portion of the first material information and first 3D geometry information. For instance, a portion of a surface of the object may be visible from both the first viewpoint and the second viewpoint. Additionally, the first material information and first 3D geometry information may describe a portion of a surface of the object that is not visible from the second viewpoint. Similarly, in some examples, the second material information and second 3D geometry information may describe a portion of a surface of the object that is not visible from the first viewpoint.

At block 306, the method 300 includes determining an alignment within a common reference system between the first 3D geometry information and the second 3D geometry information. For example, a transformation that positions the first 3D geometry information with respect to the second 3D geometry information within the common reference system may be determined. In some instances, the transformation may be composed of a rotation matrix and a translation vector that when applied to the first 3D geometry information aligns or registers the first 3D geometry information with the second 3D geometry information. In an instance in which the first 3D geometry information and the second 3D geometry information are point clouds, corresponding points between the first 3D geometry information and the second 3D geometry information may be determined.

In one example, the alignment may be an estimated alignment based on the amount of motion between the first viewpoint and the second viewpoint. For instance, if a position of the first viewpoint is to the left of a position of the second viewpoint, the alignment may attempt to align a point from a right side of the first 3D geometry information with a point from a left side of the second 3D geometry information. In another example, the estimated alignment may be determined based on features of the first 3D geometry information and the second 3D geometry information. For instance, feature descriptors for one or more key points of the first 3D geometry information and second 3D geometry information may be determined and compared. In one example, fast point feature histograms may be determined to describe local geometry around a point of point cloud and agreements between fast point feature histograms for the first 3D geometry information and the second 3D geometry information may be used to determine key points of the first 3D geometry corresponding to key points of the second 3D geometry information.

At block 308, the method 300 includes determining via a processor an error metric between both the first 3D geometry information and the second 3D geometry information as well as between the first material information and the second material information at multiple positions of the alignment. For example, an error metric for a given position of the alignment may include a first component and a second component. The first component may be associated with a difference in 3D space of the common reference system between the first 3D geometry and the second 3D geometry information at the given position. For instance, the first component may be a Euclidean distance. The second component may be associated with a difference between a first material determined based on the first material information a second material determined based on the second material information at the given position. In an instance in which the material information is associated with numbers representing different types of materials, the second component may be a function of a first number representing the first material and a second number representing a second material. For instance, the second component may be a squared distance, absolute value, etc., of the first number and the second number. The error metric may describe and be a function of the first component and the second component at multiple positions of the alignment. For example, the error metric may be a sum of squared distances in 3D space and material for the multiple positions.

At block 310, the method 300 includes adjusting the alignment based on error metrics at the multiple positions so as to converge to a minimum error metric. In some examples, the alignment between the first 3D geometry information and the second 3D geometry information may be iteratively adjusted until the error metric converges to a minimum or falls below a given threshold. For instance, the alignment between the first 3D geometry information and second 3D geometry information may be shifted and the error metric may be recalculated. The iterative closest point (ICP) algorithm and random sample consensus (RANSAC) algorithm are two example algorithms that may be used to minimize the error metric between corresponding points. However, any optimization technique may be used to minimize the error metric between points of the first 3D geometry information and points of the second 3D geometry information so as to converge the error metric to a global minimum.

In some examples, the method 300 may determine a portion of a 3D model. The method 300 may further include receiving material information and 3D geometry information associated with surfaces of the object based on at least one additional viewpoint. For example, a third viewpoint may overlap with the second viewpoint in terms of common surfaces represented by both the third viewpoint and the second viewpoint. An error metric for an alignment between both third 3D geometry information and resulting geometry information for the portion of the 3D model as well as between third material information and resulting material information for the portion of the 3D model may be determined. Subsequently, the alignment may be optimized such that the third 3D geometry information is added to the portion of the 3D model when the error metric converges to a minimum. Thus, in some instances, the method 300 may be extended to determine a 3D model for the object based on both 3D geometry information and material information from images of the object, and may be repeatedly performed to adjust alignment of any and all images of an object.

Figure 4B:
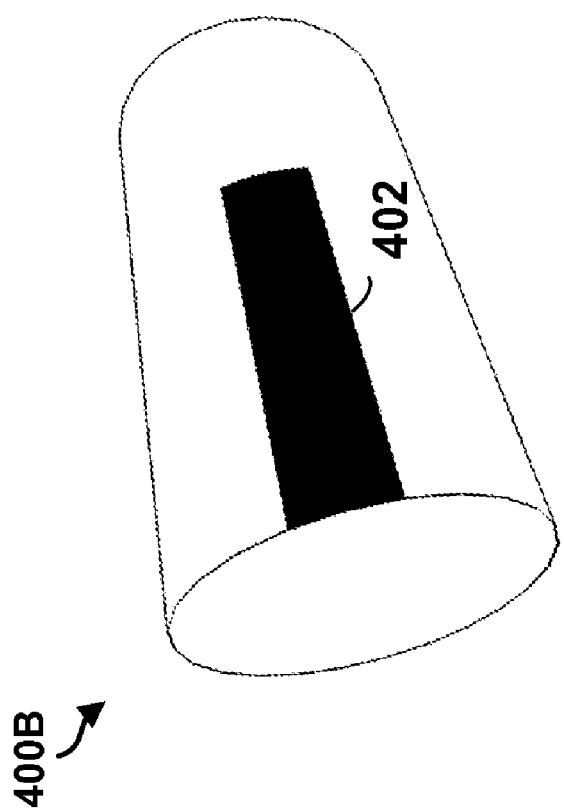
FIGS. 4A-4B are example illustrations of images of an object.
Figure 4A:
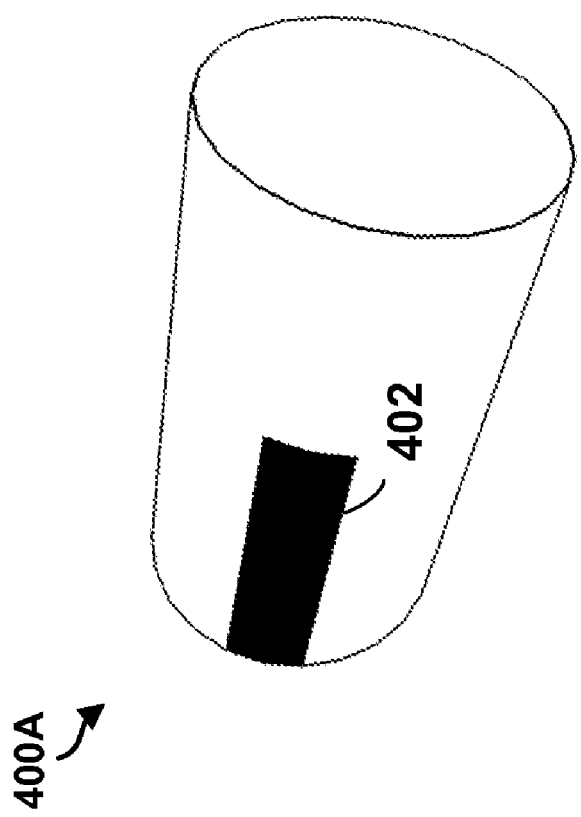

In some examples, it may be difficult to align two images of an object based on 3D geometry information alone. In one instance, an object may include a long, smooth surface that appears to be geometrically uniform; however, the object may include material differences throughout the surface. FIGS. 4A-4B are example illustrations 400A, 400B of images of an object. In one example, the illustrations 400A, 400B may be overlapping images of an object obtained from a first viewpoint and a second viewpoint. For instance, the illustration 400A may be captured from the first viewpoint while the illustration 400B may be captured from the second viewpoint. As shown in the FIGS. 4A-4B, the illustrations 400A, 400B may both describe a portion of a common surface 402 of the object that is different materially than a remaining surface of the object. For instance, the surface 402 may be plastic while the remaining surfaces of the object may be of a material that is different from plastic (e.g., metal, wood, etc.). In such an instance, determining boundary regions between the different types of materials may facilitate alignment of the two images. For example, an alignment may be determined and subsequently adjusted based on distances between positions of the boundary regions (e.g., corners of the surface 402 or other positions along the boundary of the surface 402) for an alignment between the two images.

Figure 5:
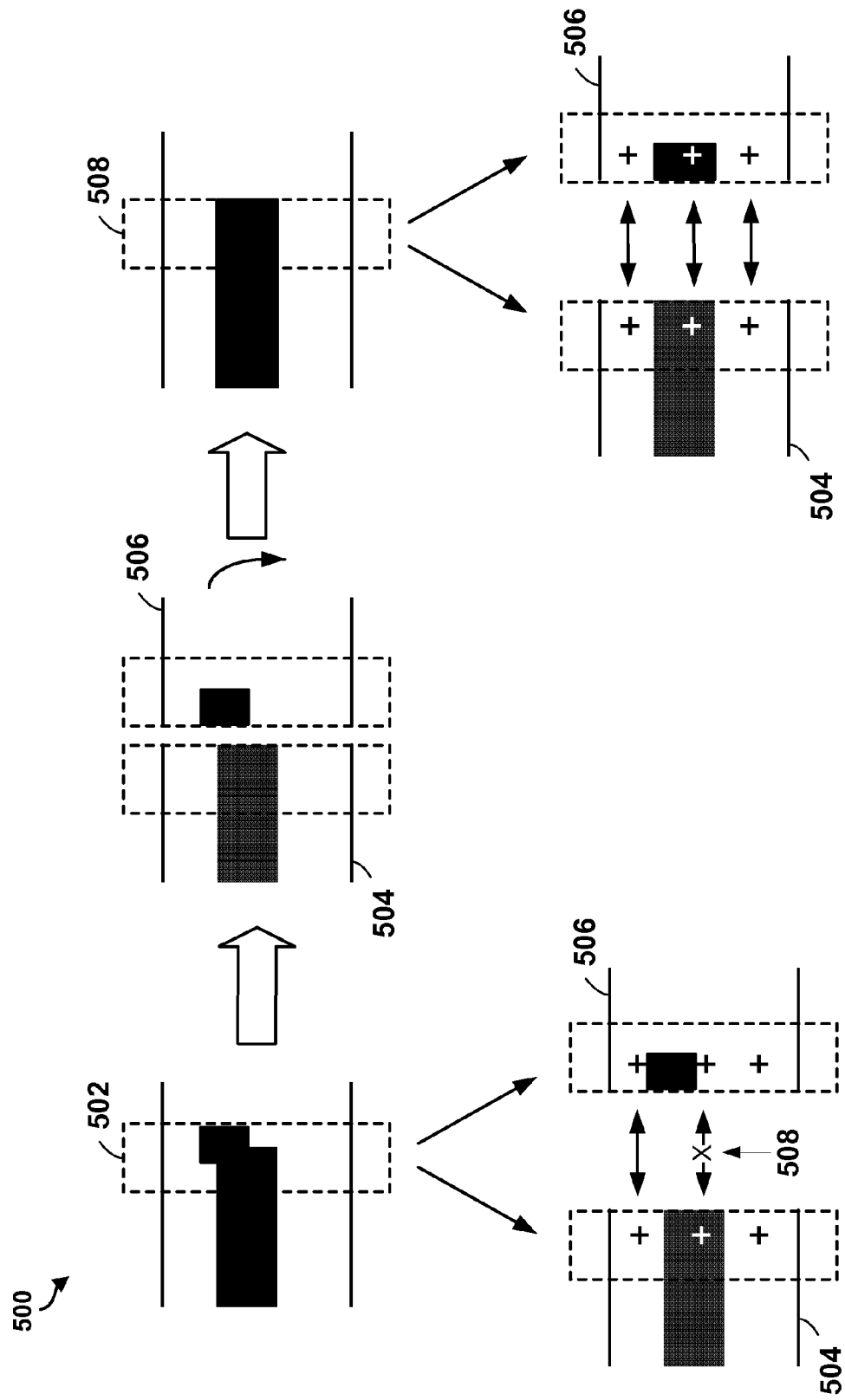
FIG. 5 is an example conceptual illustration of adjusting an alignment between two images.

FIG. 5 is an example conceptual illustration 500 of adjusting an alignment between two images. For example, the images may include material information and three-dimensional (3D) geometry information for surfaces of an object. Although the images are shown as two-dimensional shapes and colors, the images may be three-dimensional point clouds with material information associated with points of the 3D geometry information. As shown in FIG. 5, a first alignment 502 between a first 3D geometry information 504 and second 3D geometry information 506 may be determined. Based on the first alignment 502, error metrics for corresponding pairs of points of the first 3D geometry information 504 and second 3D geometry information 506 may be determined. For example, a first error metric between a first pair of points 508 may indicate that material information for a first point is different than material information for a second point of the first pair of points 508.

In one example, the first alignment 502 may be adjusted such that a second alignment 508 is determined. Additionally, based on the second alignment 508, corresponding error metrics for corresponding points of the first 3D geometry information 504 and the second 3D geometry information 506 may be determined. For example, a second error metric may indicate that material information between pairs of points of the second alignment are the same. In one instance, the second error metric may be lower than the first error metric as a result of the adjustment.

The example shown in FIG. 5 is not meant to be limiting. The first 3D geometry information 504 and the second 3D geometry information 506 may include any number of points. Similarly, an alignment between the first 3D geometry information 504 and the second 3D geometry information 506 may be of any shape or size.

In an instance in which scanned images for a plurality of similar objects have been merged, knowledge of 3D models determined based on merges of the scanned images may be leveraged to perform an initial alignment between images. For instance, if it is known that the object being scanned is a shoe, it may be determined that shoes have rubber materials on a bottom portion of the shoe. Accordingly, an alignment which places a portion of first 3D geometry information that is rubber near a portion of the second 3D geometry information that is rubber may be determined.

In some instances silhouette information associated with 3D models of objects may also be used to determine an alignment between two scanned images. For example, silhouettes from multiple viewpoints of an object can be merged to form a visual hull that is consistent with a set of silhouettes. The visual hull may represent an approximate shape for the object. In one instance, silhouettes may be captured using a camera and controlled lighting. In other instances, silhouettes may be captured by subtracting a known background from an image.

Figure 6:
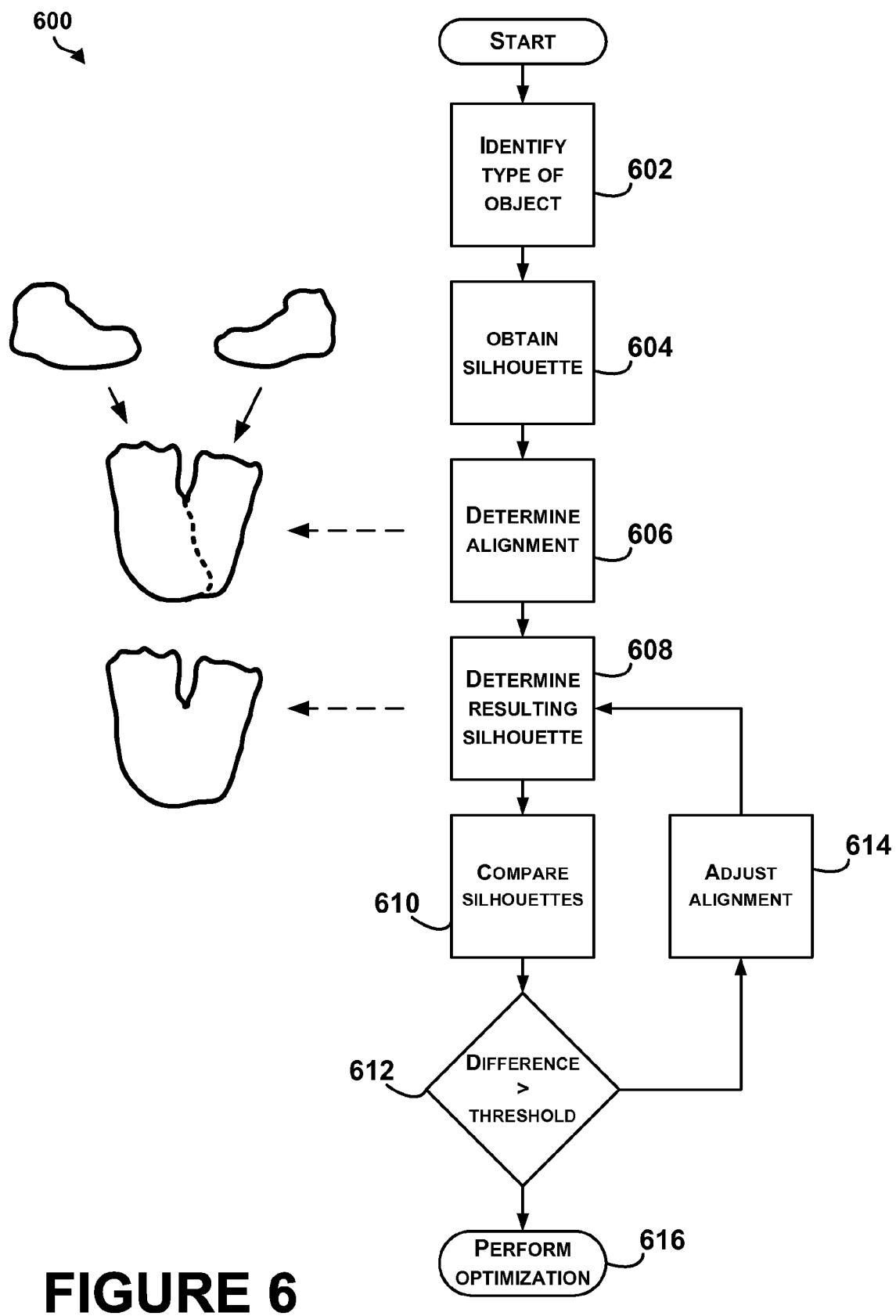
FIG. 6 is an example flow diagram for aligning scanned images.

In one instance, silhouette information for types of objects may be accessible via a database comprising information from previously merged images. FIG. 6 is an example flow diagram 600 for aligning scanned images. In one example, one or more steps of the flow diagram may be combined with one or blocks 302-310 of the method 300 of FIG. 3. In addition, the flow diagram 600 may include more or less steps.

Initially, at step 602, a type of the object is determined. For example, it may be determined that the object is a shoe, a car, a can, a book, or any group of object. Based on the type of object, a representative silhouette for the type of object may be determined at step 604 (example conceptual silhouettes are shown in FIG. 6). In one instance, the representative silhouette may be determined based on geometry information associated with a plurality of 3D models for objects of the type of object. For instance, silhouettes may be determined for previous 3D models that have been formed based on merges of scanned images and stored in a database based on classifications of the 3D models into various types of objects. In one instance, the representative silhouette may be an average silhouette for the types of objects. In another instance, the representative silhouette may be the largest silhouette for the types of objects or a silhouette that is larger than a given percentage of the types of objects.

At step 606, an alignment between two sets of three-dimensional (3D) geometry information may be determined. Following, at step 608, a resulting silhouette for the alignment may be determined. As an example, a first set of 3D geometry information describing a first portion of a shoe may be aligned with a second set of 3D geometry information. A representative silhouette for the resulting combination of the first and second set of 3D geometry information of the shoe may be determined.

In some examples, at step 610, the resulting silhouette may be compared with the representative silhouette that is obtained at step 604. Additionally, a determination may be made at step 612 based on the comparison. For instance, if a difference between the resulting silhouette and the representative silhouette is greater than a threshold, the alignment may be adjusted at step 614. After an adjustment of the alignment, the process may loop back to step 608. In another example, the difference may be less than the predetermined threshold, and at step 616, an optimization of an error metric for the alignment that is based on material information and 3D geometry information may be performed. For example, the optimization of the alignment may be similar to the optimization described previously with respect to block 310 of FIG. 3.

As an example, if the object is a shoe and an alignment results in a front portion of a shoe aligned with a tongue portion of a shoe, the alignment may yield a resulting silhouette that has a volume which is larger than an average volume for a shoe. As a result, the alignment may be adjusted, and the process may be repeated until the alignment yields a resulting silhouette that is more consistent with the representative silhouette for shoes. Thus, in some examples, silhouette information may also be used within a method for merging scanned images of an object.

Figure 7:
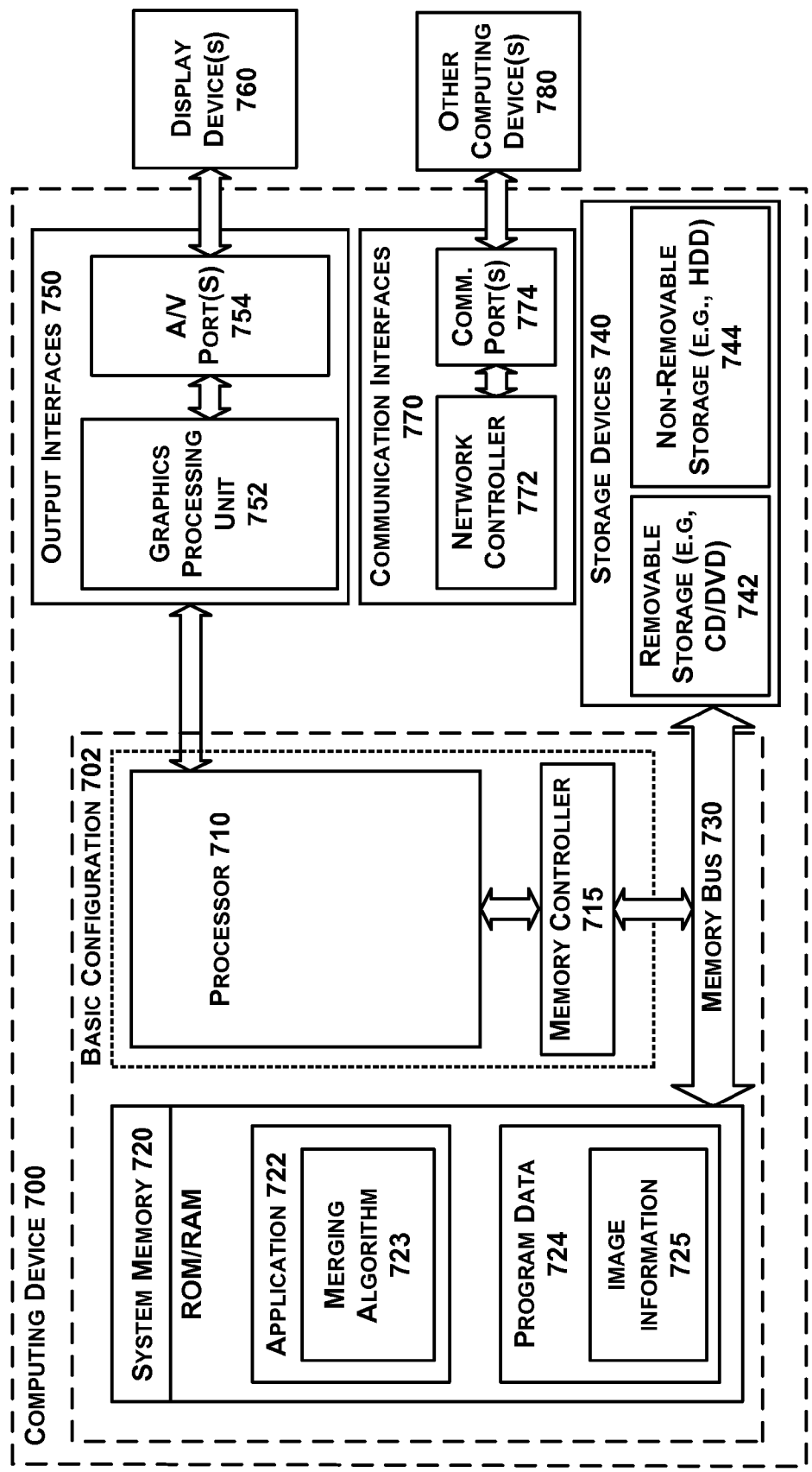
FIG. 7 is a functional block diagram illustrating an example computing device used in a computing system that is arranged in accordance with at least some embodiments described herein.

FIG. 7 is a functional block diagram illustrating an example computing device used in a computing system that is arranged in accordance with at least some embodiments described herein. The computing device may be a personal computer, mobile device, cellular phone, touch-sensitive wristwatch, tablet computer, video game system, or global positioning system, and may be implemented to provide a system for merging scanned images as described in FIGS. 1-6. In a basic configuration 702, computing device 700 may typically include one or more processors 710 and system memory 720. A memory bus 730 can be used for communicating between the processor 710 and the system memory 720. Depending on the desired configuration, processor 710 can be of any type including but not limited to a microprocessor (µP), a microcontroller (µC), a digital signal processor (DSP), or any combination thereof. A memory controller 715 can also be used with the processor 710, or in some implementations, the memory controller 715 can be an internal part of the processor 710.

Depending on the desired configuration, the system memory 720 can be of any type including but not limited to volatile memory (such as RAM), non-volatile memory (such as ROM, flash memory, etc.) or any combination thereof. System memory 720 may include one or more applications 722, and program data 724. Application 722 may include a merging algorithm 723 that is arranged to provide inputs to the electronic circuits, in accordance with the present disclosure. Program data 724 may include image information 725 that could be directed to any number of types of data. In some example embodiments, application 722 can be arranged to operate with program data 724 on an operating system.

Computing device 700 can have additional features or functionality, and additional interfaces to facilitate communications between the basic configuration 702 and any devices and interfaces. For example, data storage devices 740 can be provided including removable storage devices 742, non-removable storage devices 744, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Computer storage media can include volatile and nonvolatile, non-transitory, removable and non-removable media implemented in any method or technology for storage of information, such as computer readable instructions, data structures, program modules, or other data.

System memory 720 and storage devices 740 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 700. Any such computer storage media can be part of device 700.

Computing device 700 can also include output interfaces 750 that may include a graphics processing unit 752, which can be configured to communicate to various external devices such as display devices 760 or speakers via one or more A/V ports or a communication interface 770. The communication interface 770 may include a network controller 772, which can be arranged to facilitate communications with one or more other computing devices 780 over a network communication via one or more communication ports 774. The communication connection is one example of a communication media. Communication media may be embodied by computer readable instructions, data structures, program modules, or other data in a modulated data signal, such as a carrier wave or other transport mechanism, and includes any information delivery media. A modulated data signal can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared (IR) and other wireless media.

Computing device 700 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 700 can also be implemented as a personal computer including both laptop computer and non-laptop computer configurations.

In some embodiments, the disclosed methods may be implemented as computer program instructions encoded on a non-transitory computer-readable storage media in a machine-readable format, or on other non-transitory media or articles of manufacture. FIG. 8 is a schematic illustrating a conceptual partial view of an example computer program product that includes a computer program for executing a computer process on a computing device, arranged according to at least some embodiments presented herein.

In one embodiment, the example computer program product 800 is provided using a signal bearing medium 801. The signal bearing medium 801 may include one or more programming instructions 802 that, when executed by one or more processors may provide functionality or portions of the functionality described above with respect to FIGS. 1-7. In some examples, the signal bearing medium 801 may encompass a computer-readable medium 803, such as, but not limited to, a hard disk drive, a Compact Disc (CD), a Digital Video Disk (DVD), a digital tape, memory, etc. In some implementations, the signal bearing medium 801 may encompass a computer recordable medium 804, such as, but not limited to, memory, read/write (R/W) CDs, R/W DVDs, etc. In some implementations, the signal bearing medium 801 may encompass a communications medium 805, such as, but not limited to, a digital and/or an analog communication medium (e.g., a fiber optic cable, a waveguide, a wired communications link, a wireless communication link, etc.). Thus, for example, the signal bearing medium 801 may be conveyed by a wireless form of the communications medium 805 (e.g., a wireless communications medium conforming with the IEEE 802.11 standard or other transmission protocol).

The one or more programming instructions 802 may be, for example, computer executable and/or logic implemented instructions. In some examples, a computing device such as the computing device 700 of FIG. 7 may be configured to provide various operations, functions, or actions in response to the programming instructions 802 conveyed to the computing device 700 by one or more of the computer readable medium 803, the computer recordable medium 804, and/or the communications medium 805.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   receiving first material information and first three-dimensional (3D) geometry information associated with surfaces of an object based on a first viewpoint, wherein material information identifies given points of the surfaces of the object as being of a given material;
   receiving second material information and second 3D geometry information associated with the surfaces of the object based on a second viewpoint, wherein the second viewpoint differs from the first viewpoint by an amount of motion within a common reference system;

determining an alignment within the common reference system between the first 3D geometry information and the second 3D geometry information;

determining via a processor an error metric between both the first 3D geometry information and the second 3D geometry information as well as between the first material information and the second material information at multiple positions of the alignment; and adjusting the alignment based on error metrics at the multiple positions so as to converge to a minimum error metric.

2. The method of claim 1, further comprising receiving the first 3D geometry information and the second 3D geometry information from one or more 3D scanners.

3. The method of claim 1, further comprising:

receiving first color information associated with the surfaces of the object based on the first viewpoint;

receiving second color information associated with the surfaces of the object based on the second viewpoint; and determining the first material information and the second material information using a materials library, wherein the materials library includes the material information for the given points of the surfaces of the object based on given color information.

4. The method of claim 1, wherein an error metric for a given position of the alignment comprises:

a first component associated with a difference in 3D space of the common reference system between the first 3D geometry information and the second 3D geometry information at the given position; and a second component associated with a difference between a first material determined based on the first material information and a second material determined based on the second material information at the given position.

5. The method of claim 1, further comprising:

receiving information identifying a type of the object;

determining a representative silhouette for the type of object, wherein the representative silhouette is determined based on geometry information associated with a plurality of 3D models for objects of the type of object; and adjusting the alignment between the first 3D geometry information and the second 3D geometry information based on the representative silhouette.

6. The method of claim 5, wherein adjusting the alignment between the first 3D geometry information and the second 3D geometry information based on the representative silhouette comprises:

determining a second alignment of the first 3D geometry information and the second 3D geometry information;

determining a resulting silhouette for the second alignment;

determining whether the resulting silhouette differs from the representative silhouette by more than a predetermined amount; and when the resulting silhouette differs from the representative silhouette by more than the predetermined amount, adjusting the second alignment such that a difference between the resulting silhouette and the representative silhouette is reduced.

7. The method of claim 1, further comprising adjusting the alignment based on error metrics until the error metric converges to a global minimum.

8. The method of claim 1, wherein determining the alignment within the common reference system between the first 3D geometry information and the second 3D geometry information comprises determining a portion of a 3D model of the object.

9. The method of claim 8, further comprising:

receiving material information and 3D geometry information associated with surfaces of the object based on at least one additional view point; and optimizing at least one additional alignment within the common reference system between the 3D geometry information associated with the at least one additional viewpoint and the portion of the 3D model.

10. A non-transitory computer-readable medium having stored therein instructions executable by a computing device to cause the computing device to perform functions comprising:

receiving first material information and first three-dimensional (3D) geometry information associated with surfaces of an object based on a first viewpoint, wherein material information identifies given points of the surfaces of the object as being of a given material;

receiving second material information and second 3D geometry information associated with the surfaces of the object based on a second viewpoint, wherein the second viewpoint differs from the first viewpoint by an amount of motion within a common reference system;

determining an alignment within the common reference system between the first 3D geometry information and the second 3D geometry information;

determining via a processor an error metric between both the first 3D geometry information and the second 3D geometry information as well as between the first material information and the second material information at multiple positions of the alignment; and adjusting the alignment based on error metrics at the multiple positions so as to converge to a minimum error metric.

11. The non-transitory computer-readable medium of claim 10, further comprising instructions executable by the computing device to cause the computing device to perform functions comprising:

receiving first texture information associated with the surfaces of the object based on the first viewpoint;

receiving second texture information associated with the surfaces of the object based on the second viewpoint; and determining the first material information and the second material information using a materials library, wherein the materials library includes the material information for the given points of the surfaces of the object based on given texture information.

12. The non-transitory computer-readable medium of claim 10, wherein an error metric for a given position of the alignment comprises:

a first component associated with a difference in 3D space of the common reference system between the first 3D geometry information and the second 3D geometry information at the given position; and a second component associated with a difference between a first material determined based on the first material information and a second material determined based on the second material information at the given position.

13. The non-transitory computer-readable medium of claim 10, further comprising instructions executable by the computing device to cause the computing device to perform functions comprising:

receiving information identifying a type of the object;

determining a representative silhouette for the type of object, wherein the representative silhouette is determined based on geometry information associated with a plurality of 3D models for objects of the type of object; and adjusting the alignment between the first 3D geometry information and the second 3D geometry information based on the representative silhouette.

14. The non-transitory computer-readable medium of claim 13, wherein adjusting the alignment between the first 3D geometry information and the second 3D geometry information based on the representative silhouette comprises:
determining a second alignment between the first 3D geometry information and the second 3D geometry information;
determining a resulting silhouette for the second alignment;
determining whether the resulting silhouette differs from the representative silhouette by more than a predetermined amount; and
when the resulting silhouette differs from the representative silhouette by more than the predetermined amount, adjusting the second alignment such that a difference between the resulting silhouette and the representative silhouette is reduced.

15. A system comprising:
a scanning component, the scanning component configured to determine color information and three-dimensional (3D) geometry information associated with surfaces of an object based on multiple viewpoints, wherein viewpoints of the multiple viewpoints differ by amounts of motion within a common reference system;
a materials library, the materials library including material information based on the color information, wherein material information identifies given points of the surfaces of the object as being of a given material;
an alignment component, the alignment component configured to determine an alignment within the common reference system between first 3D geometry information of a first viewpoint and second 3D geometry information of a second viewpoint; and
an optimization component, the optimization component configured to:
determine via a processor an error metric between both the first 3D geometry information and the second 3D geometry information as well as between first material information of the first viewpoint and second material information of the second viewpoint at multiple positions of the alignment; and
adjust the alignment based on error metrics at the multiple positions so as to converge to a minimum error metric.

16. The system of claim 15, wherein an error metric for a given position of the alignment comprises:
a first component associated with a difference in 3D space of the common reference system between the first 3D geometry information and the second 3D geometry information at the given position; and
a second component associated with a difference between a first material determined based on the first material information and a second material determined based on the second material information at the given position.

17. The system of claim 15, further comprising:
a silhouette database, wherein the silhouette database comprises representative silhouettes for given types of objects based on geometry information associated with a plurality of 3D models for objects of a given type; and
wherein the optimization component is further configured to:
determine a representative silhouette for the object based on a type of the object; and
adjust the alignment between the first 3D geometry information and the second 3D geometry information based on the representative silhouette.

18. The system of claim 17, wherein the optimization component is further configured to:
determine a second alignment between the first 3D geometry information and the second 3D geometry information;
determine a resulting silhouette for the second alignment;
determine whether the resulting silhouette differs from the representative silhouette by more than a predetermined amount; and
when the resulting silhouette differs from the representative silhouette by more than the predetermined amount, adjust the second alignment such that a difference between the resulting silhouette and the representative silhouette is reduced.

19. The system of claim 15, wherein the alignment component is further configured to determine a portion of a 3D model of the object.

20. The system of claim 19, wherein the alignment component is further configured to:
determine at least one additional alignment with the common reference system between the portion of the 3D model and additional 3D geometry information of an additional viewpoint.

* * * * *